(12) United States Patent
Walsh et al.

(10) Patent No.: US 7,533,012 B2
(45) Date of Patent: May 12, 2009

(54) MULTI-USER WEB SIMULATOR

(75) Inventors: Robert E. Walsh, Foster City, CA (US); Michael P. Shea, Nashua, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 1429 days.

(21) Appl. No.: 10/319,057

(22) Filed: Dec. 13, 2002

(65) Prior Publication Data

US 2004/0117460 A1 Jun. 17, 2004

(51) Int. Cl.
G06F 13/10 (2006.01)
G06F 15/173 (2006.01)

(52) U.S. Cl. ......................................... 703/21; 709/224

(58) Field of Classification Search ................. 709/224; 703/21

See application file for complete search history.

(56) References Cited

U.S. PATENT DOCUMENTS

| | | | |
|---|---|---|---|
| 5,355,497 A | 10/1994 | Cohen-Levy | |
| 5,485,606 A | 1/1996 | Midgdey et al. | |
| 5,838,909 A | 11/1998 | Roy et al. | |
| 5,966,162 A | 10/1999 | Goode et al. | |
| 6,138,112 A | 10/2000 | Slutz | |
| 6,154,744 A | 11/2000 | Kenner et al. | |
| 6,178,419 B1 | 1/2001 | Legh-Smith et al. | |
| 6,243,832 B1 | 6/2001 | Eckes et al. | |
| 6,269,401 B1 | 7/2001 | Fletcher et al. | |
| 6,295,557 B1 * | 9/2001 | Foss et al. | 709/224 |
| 6,321,264 B1 | 11/2001 | Fletcher et al. | |
| 6,415,317 B1 | 7/2002 | Yelon et al. | |
| 6,505,238 B1 * | 1/2003 | Tran | 709/208 |
| 6,560,648 B1 | 5/2003 | Dunn et al. | |
| 6,665,658 B1 | 12/2003 | DaCosta et al. | |
| 6,738,933 B2 * | 5/2004 | Fraenkel et al. | 714/47 |
| 6,832,184 B1 * | 12/2004 | Bleier et al. | 703/23 |
| 6,868,434 B1 | 3/2005 | Terranova et al. | |
| 2002/0026321 A1 | 2/2002 | Faris et al. | |
| 2002/0147969 A1 | 10/2002 | Lethin et al. | |
| 2004/0117460 A1 | 6/2004 | Walsh et al. | |

OTHER PUBLICATIONS

Microsoft Computer Dictionary, 2002, Fifth Edition, pp. 16, 283, 361, 536, and 562.*
"Intel Server Board SDS2: ISAPI Ecommerce WebBench Tests," E Testing Labs, Apr. 2002, (8 pages).

* cited by examiner

Primary Examiner—Paul L Rodriguez
Assistant Examiner—J Ochoa
(74) Attorney, Agent, or Firm—Robert C. Kowert; Meyertons, Hood, Kivlin, Kowert & Goetzel, P.C.

(57) ABSTRACT

A simulator running on a single computer may be configured to appear as multiple users simultaneously initiating Internet requests from separate user environments. An engine of the simulator may communicate with a browser to appear as multiple users each having access to a local defined user account or profile in a computer environment. The simulator may be configured to maintain different user profile data for each user appearing to operate within a separate user environment. The simulator may be configured to simulate a user logged into a particular desktop environment that initiates a browser session and then initiates Internet requests via the browser. The simulator may also simulate at the same time a different user in a different user environment initiating a browser session and initiating Internet requests via the browser. The simulator may be configured to appear as multiple, separate users initiating Internet requests from multiple, different user environments.

31 Claims, 9 Drawing Sheets

MULTI-USER WEB SIMULATOR

BACKGROUND

1. Field of the Invention

This invention relates to computer systems, and more particularly to simulation of Internet traffic.

2. Description of the Related Art

The Internet is used for many commercial and non-commercial solutions to provide content or services to multiple users. Business solutions may include selling goods and serving customers online. Non-commercial entities may use the Web to provide access to certain resources to a wide variety of geographically diverse users. While many types of technologies (e.g., Web servers, application servers, browsers, platforms, security protocols, etc.) may be important for deploying Internet-based solutions, how well these diverse technologies work together to provide secure and reliable services may be crucial for success of such systems. These technologies may help companies to fully leverage backend resources such as legacy applications, distributed system databases and even Web-based content. Such backend resources may be made available via the Internet to various users such as customers, partners and employees of the company.

Backend resources may be provided through Web services to the users. A Web service may represent a unit of functionality that can be accessed over the Web. For example, Web services may share business logic, data and processes through a programmatic interface across a network. Developers may then add the Web services to a graphical user interface (e.g., a Web page or an executable program) to offer specific functionality to users. For example, a user could be a person accessing the service through a desktop browser or wireless browser. A user could also be an application program or another Web service.

Numerous challenges are often presented during testing of whether the Web services can be provided by various technologies under different conditions. Developers of Internet technologies typically test products prior to release. Despite similarities in intended functionality, Web services (or access to Web services) operating within different environments may deliver unexpected results under certain conditions. For example, different types of browsers may support different functions and interact differently with an Internet-based server (e.g., Web server, application server, portal server, etc.). In additional to interacting correctly with different client applications, such as browser, an Internet-based solution may also need to interact with other servers, backend systems, Internet sites, etc. Developers may increase testing cost and time by creating and recreating test environments as technologies evolve and/or emerge.

Having to test many possible scenarios (e.g., multiple users initiating Internet requests using different Internet technologies under different conditions) may further increase testing cost and time. A system may need to operate with many different Internet technologies that facilitate development of Web applications that can be executed on different platforms and developed in different languages. Numerous types of protocols, methods and other mechanisms may also be used. For example, secure access to Web services may be handled by several different security methods such as basic, digest and XML Digital Signatures (XMLDSIG). Different browsers may handle different types of Web content differently. A server operating in one environment may need to operate differently in another environment. The wide variety of evolving technologies and components in Internet-based systems may complicate testing of such systems. Various different environments and technologies may need to be recreated to properly test a Web application. Such systems may need to concurrently handle requests from multiple different users that may be using different client applications to access the Web- or Internet-based system. Creating the wide variety of conditions to test such systems may be very expensive and time consuming.

SUMMARY

A multi-user Web simulator may be executed from a single computer to simulate multiple users that initiate Internet requests. The simulator may be configured to generate Internet requests (as a simulation of multiple users initiating Internet requests) to components (e.g., a Web server or application server). The simulator may operate on a client computer that is configured to access these components via an Internet/Intranet. In one embodiment, the components may be resources of a computer system that is based on a three-tier architecture.

The simulator may be configured to appear as multiple users simultaneously initiating Internet requests from separate user environments. For example, an engine of the simulator may be used to configure a browser to appear as multiple users each having access to a local defined user account or profile in a computer environment. In one embodiment, the simulator may be configured to maintain different user profile data and different variables (e.g., access permissions) for each user appearing to operate within a separate user environment. The simulator may be configured to simulate a user logged in to a particular desktop environment that initiates a browser session and then initiates Internet requests via the browser. The simulator may also simulate at the same time a different user in a different user environment initiating a browser session and initiating Internet requests via the browser. The simulator may be configured to appear as multiple, separate users initiating Internet requests from multiple, different user environments. In one embodiment, one user environment may be a Windows XP based environment, while another environment may be a Linux based environment, for example.

In one embodiment, a single computer system may include one or more processors and a memory coupled to the one or more processors configured to store program instructions executable by the one or more processors to implement a simulator. The simulator may include a simulation engine configured to generate concurrent user activity for multiple different simulated users. The simulator may also include a first browser configured to receive the user activity from the simulation engine and send Internet requests to one or more destinations according to the user activity so that the Internet requests from the browser appear to be from multiple different concurrent users. The simulation engine may be configured to generate the user activity so that at least two of the multiple different concurrent users appear to be operating from different user environments In one embodiment, the simulation engine may be configured to receive responses to the Internet requests through the first browser. The simulation engine may be configured to generate additional user activity in response to the responses for the multiple different concurrent users. The simulator may also include a monitor configured to record Internet traffic for each of the multiple users including the Internet requests and responses to the Internet requests. Configuration data may be stored in the memory specifying configuration information for the simulator. The simulation engine may be configured to read the configuration data and configure a multi-user Internet simulation based on the configuration data. The configuration data may specify the number of different concurrent users. The configuration data may include a script for the user activity for each of the multiple concurrent users.

In one embodiment, the simulation engine may be configured to generate user activity for a plurality of different user authentication methods so that corresponding Internet requests are sent from the first browser for the plurality of different concurrent users using the plurality of different authentication methods. The simulation engine may be configured to generate user activity for active content so that corresponding Internet requests are sent from the first browser for the multiple different concurrent users requesting different types of active content. In one embodiment, the simulator may include a second browser of a different type from the first browser. The simulation engine maybe configured to generate user activity for both browsers so that the simulator sends Internet requests for multiple different concurrent users from multiple different types of browsers.

In one embodiment, a method for simulating multiple Web users may include generating concurrent user activity for multiple different simulated users, and from a single browser receiving the user activity, sending Internet requests to one or more destinations according to the user activity so that the Internet requests from the single browser appear to be from multiple different concurrent users. The method may also include receiving responses to the Internet requests and recording Internet traffic comprising the Internet requests and responses.

While the invention is described herein by way of example for several embodiments and illustrative drawings, those skilled in the art will recognize the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
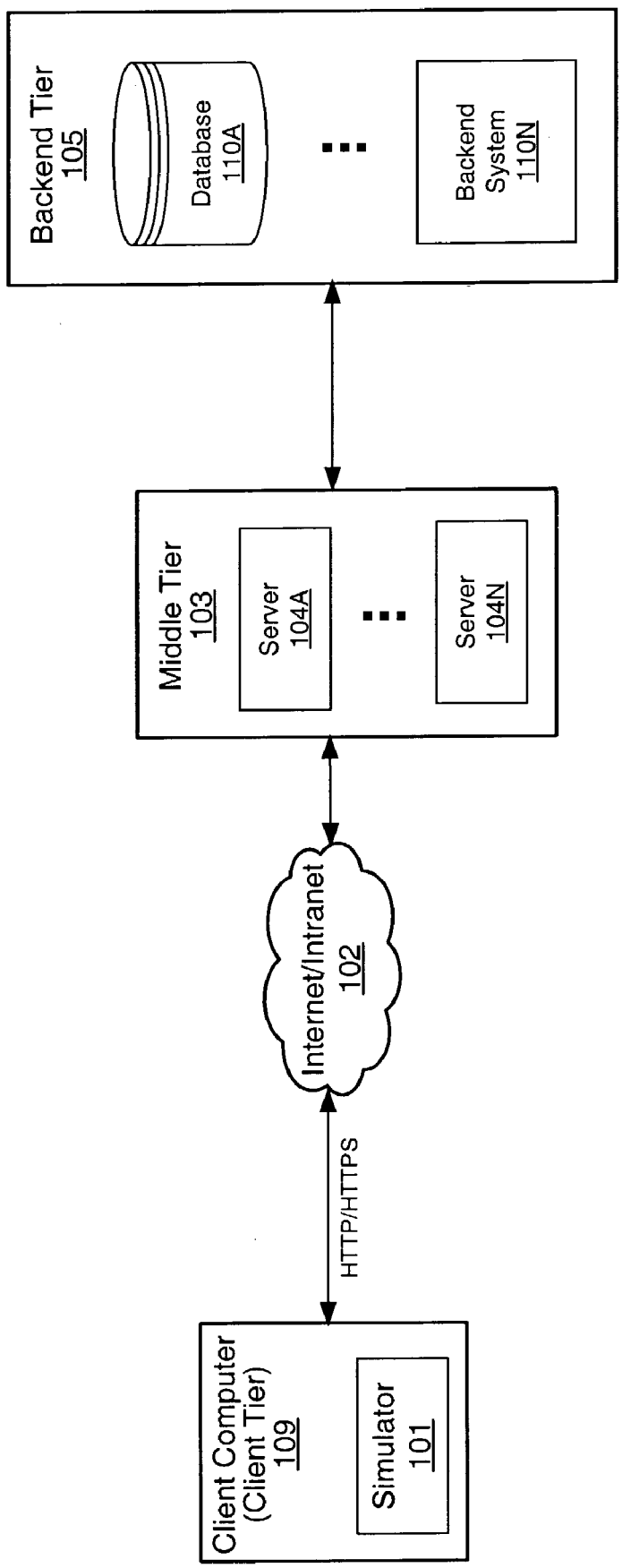
FIG. 1 illustrates a single computer system including one embodiment of a simulator that is configured to simulate multiple users initiating Internet requests.

FIG. 1 illustrates a single computer system 109 including one embodiment of a simulator 101. The simulator 101 may be configured to simulate multiple users that initiate Internet requests. The simulator 101 may be configured to generate Internet requests (as a simulation of multiple users initiating Internet requests) to components (e.g., server 104A and backend system 110N). The simulator 101 may operate on a client computer 109 that is configured to access these components via an Internet/Intranet 102. In one embodiment, the components may be resources of a computer system that is based on a three-tier architecture. In other embodiments, the simulator 101 may generate the Internet requests to resources of a computer system that is based on a two-tier or multi-tier architecture. Thus, the components of a computer system based on the three-tier architecture of FIG. 1 illustrate only one example of components that may be exercised by simulator 101. In other embodiments, the simulator 101 may generate Internet requests to different components of a system based on a different architecture.

The simulator 101 may be configured to simulate multiple users that initiate Internet requests for Internet or Web services. An Internet or Web service may represent a unit of functionality that may be accessed over the Internet. For example, Web services may share business logic, data and processes through a programmatic interface across a network. Software code (e.g., Java Web Services Developers Pack—Java WSDP) may be provided to developers that developers can configure into sets of Web services. Developers may add these Web services to a graphical user interface (e.g., a Web page or an executable program) to offer specific functionality to users. A user may be a person accessing the Web service through a desktop browser, wireless browser or some other user interface. A user could also be an application program or another Web service.

Tiers, such as middle tier 103 and backend tier 105, may represent the logical or physical organization of components as service providers (e.g., application systems such as backend system 110N providing Web services to a server 104) and consumers (e.g., a server 104 consuming Web services from application systems such as database 110A). Components within a tier typically consume the Web services of components in an adjacent provider tier and provide services to one or more adjacent consumer tiers. For example, as a consumer of Web services, components within each tier typically request Web services from an adjacent provider tier. As a provider of Web services, components within a tier typically forward Web services to the consumer. Thus, a user accessing the Internet through a desktop browser as a consumer within a client tier may request a Web service from a server 104 and the server 104 may provide the Web service to the user.

Within a tier, Web services may be organized together according to like requirements, for example, functionality, security, or load distribution. Multiple users with access to a component in a client tier may initiate Internet requests to each component in a middle tier 103 that is configured to provide Web services to the component in the client tier. The components in middle tier 103 may, in turn, request these Web services from components in backend tier 105 and the components in the backend tier 105 may provide the Web services to the multiple users via the components in middle tier 103. Connectivity between tiers may dynamically change depending upon a user's request for Web services, for example.

A client tier may include components (e.g., device, system, user interface) that manage display and local interaction processing. A client tier may aggregate and personalize content and Web services into user interfaces. For example, a client may consist of a Web browser that displays dynamic Web pages received from a component in the middle tier 103 (e.g., server 104A). User interfaces may include the assembly of content, formatting, conversions and content transformations, or other functions that deal with the presentation of information to end users. For example, user display services (e.g., session, text input, dialog and display management) may be handled in the client tier.

The middle tier 103 may include components (e.g., servers 104A through 104N) that execute business logic and manage transactions. Examples range from low-level processing such as authentication and mail transport to true line-of-business processing such as order entry, customer profile and inventory management. The middle tier 103 may provide process management services (e.g., process development, process enactment, process monitoring, and process resourcing) that are shared by multiple components. Components may be placed in the middle tier 103 to be available for various components that interact together as part of a computer system. For example, a Web server component within middle tier 103 of a three-tier architecture may control transactions and asynchronous queuing to ensure reliable completion of the transactions.

The backend tier 105 may include resources such as legacy systems, databases, external data feeds, and specialized hardware devices such as factory automation. For example, a database 110A within the backend tier 105 may be integrated as part of a Web application and may provide database management functionality for the Web application. The database 110A may be dedicated to data and file services that can be optimized without using any proprietary database management system languages. Such a component in backend tier 105 may ensure that data is consistent throughout a distributed computer system through the use of features such as data locking and replication. The backend tier 105 may also include other backend systems 110N such as legacy applications or other systems that include obsolete technology.

Each middle tier 103 and backend tier 105 may include any number of components as represented by servers 104N and backend components 110N. In addition, the middle tier 103 may be further divided into two or more tiers with different functions (e.g., two-tiered or multi-tiered). Additional tiers of a computer system may be included, for example, to off-load as much functionality as possible to a component in the middle tier 103 (e.g., add more functionality to business logic of a server 104 instead of to a user interface).

Each component within the middle 103 and backend tier 105 may execute on a separate platform. Multiple components may also execute on the same platform. Each platform may be associated with the physical computing hardware and software that together support the components which provide Web services. The software portion of the platform may include an operating system along with associated low-level mechanisms of the operating system. For example, an internal, platform-dependent mechanism (e.g., a software module accessible only to that operating system) may be used when providing Web services to users. The computing hardware portion of the platform may include hardware such as servers, storage hardware (e.g., storage arrays), and networking hardware like switches and routers.

A system may rely upon interoperability between the various components and between each tier. For example, a client tier may include different types of browsers for user interaction such an Internet Explorer or Netscape and may each run on a platform such as Windows 2000™ from Microsoft, Solaris™ from Sun Microsystems, or some other platform. The middle tier 103 may include different types of servers (e.g., Web servers, portal servers, application servers, etc) and may each run on a platform such as Windows 2000 from Microsoft, Solaris from Sun Microsystems, or some other platform. Sun Cobalt™, Apache Web server, Sun™ ONE (Sun Open Net Environment), IBM WebSphere™, Windows 2000 Web server and Windows .Net™ are exemplary server technologies from various suppliers and open sources. The backend tier 105 may include different types of resources such as legacy systems and databases (e.g., ORACLE™ and Sybase™) and may run on a platform such as Windows 2000 from Microsoft, Solaris from Sun Microsystems, or some other platform.

Connectivity between the components within each tier may also rely upon different types of protocols. For example, Hyper Text Transfer Protocol (HTTP) and Hyper Text Transfer Protocol Secure sockets (HTTPS) may be used to transmit data between components in a client tier and middle tier 103. Java™ Database Connectivity (JDBC), Java Naming and Database Interface (JNDI), eXtensible Markup Language (XML) and/or Simple Object Access Protocol (SOAP) may be used to transmit data between middle tier 103 and backend tier 105. Remote Method Invocation (RMI) and Internet Inter-ORB Protocol (HOP) are other exemplary protocols.

Depending on varied conditions, the technologies used may impact the response to Internet requests initiated by multiple users. For example, behavior and/or responses may change depending on type of browser, type of security method and/or domain membership. Different servers running on different platforms may behave differently when responding to an Internet request. For example, a particular server (e.g., Web server, application server, portal server, etc.) interacting with a certain type of browser may produce a different result than when interacting with another type of browser. Different servers may interact differently with each other and/or with clients that may be executing on different platforms. Different browsers may handle different types of Web content differently. Secure access to Web services, for example, may be handled by several different authentication methods which may each behave differently under different circumstances. Many other conditions may impact the correct response to Internet requests. A developer may need to verify whether these technologies operate correctly under certain conditions. For example, a developer may need to verify if a particular server delivers a Web service to a user correctly after the user is granted access to the Web service. Simulator 101 may generate and respond to Internet traffic in order to test various conditions under which a multi-tier Internet-based system may operate. The simulator 101 may simulate different conditions such as multiple users, different user environments, different browsers, and different authentication mechanisms.

Figure 2:
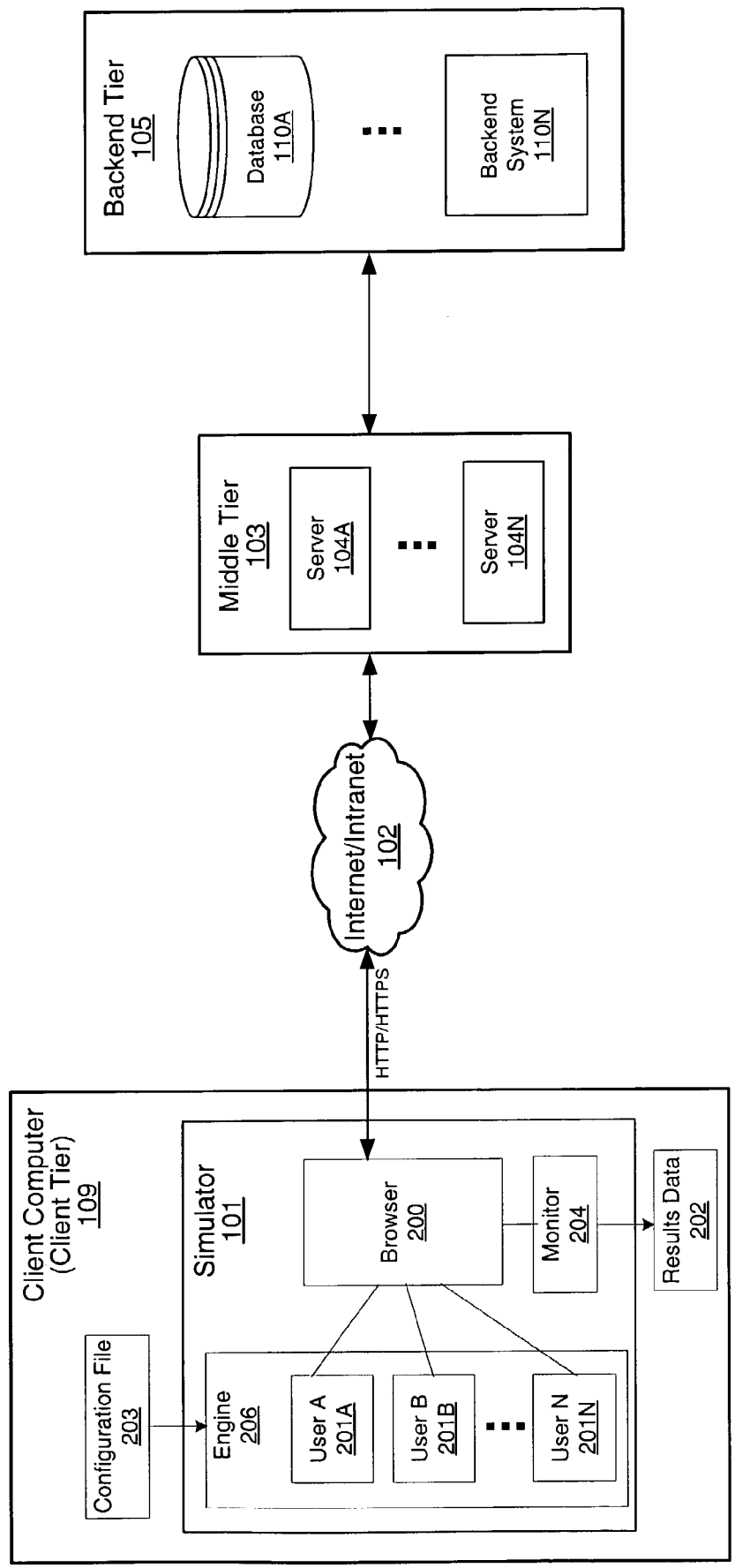
FIG. 2 illustrates one embodiment of a simulator configured to simulate multiple users initiating Internet requests via a Web browser.

FIG. 2 illustrates one embodiment of a simulator 101 that may simulate multiple users 201 (e.g., User A, User B, etc.) initiating Internet requests via a Web browser 200. In one embodiment, the simulator 101 may be configured to simulate user activity of components within a client tier of a multi-tier architecture. For example, the simulator 101 may be configured to simulate multiple users (e.g., clients within a client tier) accessing one or more servers 104 in a middle tier 103 via Internet browsers. From a single client computer 109, simulator 101 may cause browser 200 to appear as multiple different clients.

In one embodiment, an engine 206 may be configured to invoke a standard Internet browser (e.g., Internet Explorer or Netscape Navigator) as the browser 200. In other embodiments, the simulator 101 may invoke its own browser functionality. The engine 206 may be configured to communicate with the browser 200 to simulate a plurality of different users. For example, the engine 206 may be configured to send data to the browser 200 and the browser 200 may use the data to send requests from the multiple users 201.

The simulator 101 may be configured to appear as multiple users simultaneously initiating Internet requests from separate user environments. For example, the engine 206 may be used to configure the browser 200 to appear as multiple users 201 each having access to a local defined user account or profile in a computer environment. In one embodiment, the simulator 101 may be configured to maintain different user profile data and different variables (e.g., access permissions) for each user 201 appearing to operate within a separate user environment. The simulator 101 may be configured to simulate a user (e.g. User A) logged in to a particular desktop environment that initiates a browser session and then initiates Internet requests via the browser. The simulator 101 may also simulate at the same time a different user (e.g., User B) in a different user environment initiating a browser session and initiating Internet requests via the browser. The simulator 101 may be configured to appear as multiple, separate users 201 initiating Internet requests from multiple, different user environments (e.g., one user environment for User A, one user environment for User B, etc.). In one embodiment, one user environment may be a Windows XP based environment, while another environment may be a Linux based environment, for example.

Conversely, the simulator 101 may also be configured to appear as multiple, different client sessions from the same user environment. For example, the simulator 101 may be configured to appear as multiple, different users 201 initiating Internet requests from the same user environment (e.g., one user environment for both User A and User B). Thus, the simulator 101 may be configured to simulate multiple Internet requests from separate users operating Internet browsers on multiple desktop computers.

The engine 206 may communicate with browser 200 as multiple different users 201. For example, the engine 206 may be configured to read a file containing configuration data 203 to obtain data that may be used to communicate with the browser 200. The configuration data 203 may specify conditions and other data associated with one or more simulations. For example, in one embodiment, the configuration data 203 may specify a number of users, Internet request scripts for each user (e.g., Internet addresses such as URLs and data for requests, etc.), login identifiers, access permissions, authentication methods, user profiles, etc. The configuration data 203 may specify one or more scripts that may be used to simulate a large number of users from the browser 200 on the single client platform 109. For example, a script may indicate how many users should be simulated and associated Internet requests for those users, and the engine 206 may be configured to repetitively read data in the script to initiate user actions through the browser 200 for the indicated number of users. The engine 206 may be configured to access the configuration data 203 and to configure a simulation that executes on a single client computer 109 based on the configuration data 203.

In one embodiment, the simulator 101 may be configured to monitor the Internet traffic of each user environment separately. For example, one embodiment of a simulator 101 may include a monitor 204 that may be configured to record or journal the traffic flow that occurs between the user clients 201 and servers 104. The simulator 101 may be configured to simulate user activity (users initiating Internet requests via browser 200) and may record requests and responses to the requests. As the browser 200 simulates various users, the monitor 204 may be configured to capture the traffic flow and output results data 202 for each simulation. The results data 202 may be used to obtain information regarding the different conditions present during a simulation. In one embodiment, the monitor 204 may be configured to record data associated with a component (e.g., a server 104) that is being accessed as part of a simulation. The monitor 204 may record data such as type of browser or number of interactions with a server 104 (e.g., number of times the browser 200 accesses a server 104).

A developer may use the simulator 101 to verify that components within each tier operate correctly as user activity from the client tier is simulated. The client tier (as simulated by the simulator 101), middle tier 103 and backend tier 105 may represent the logical or physical organization of components as service providers (e.g., backend system 110N responding to requests from a server 104) and consumers (e.g., User A receiving a response to a request from a server 104). The developer may use the simulator 101 to test components under conditions that are present as part of a simulation. The simulator 101 may be configured to simulate multiple users initiating Internet requests using multiple, different environments. For example, a site under test may include a server 104 operating on a Sun platform and another server 104 operating on a Windows NT platform. Varied conditions may affect correct responses to Internet requests. The simulator 101 may be configured to simulate, for example, multiple users initiating Internet requests using multiple, different protocols, methods and/or mechanisms. A developer may wish to test different types of security methods interacting with different types of browsers and the simulator 101 may be configured to simulate user activity under those conditions. A developer may wish to test one type of server 104 interacting with one type of backend system 110N and the simulator 101 may be configured to simulate user activity to exercise those components.

The simulator 101 may be configured to enable a developer to verify that components operate correctly under various conditions as defined and configured by the developer. A developer may change these conditions which may affect correct responses to Internet requests. The developer may specify different conditions (e.g., addresses for different servers 104 or different servers 104 relying on different protocols) in configuration data 203. For example, a large number of users may be needed to exercise a server's 104 ability to concurrently handle multiple Internet requests involving different types of Web content and the simulator 101 may be configured to mimic those users operating in separate user environments. In some embodiments, the simulator 101 may be configured to mimic a single user. For example, a developer may wish to test different types of transfer protocols (e.g., protocols between middle tier 103 and backend tier 105) interacting with a single browser and the simulator 101 may be configured to simulate user activity under those conditions.

Figure 3:
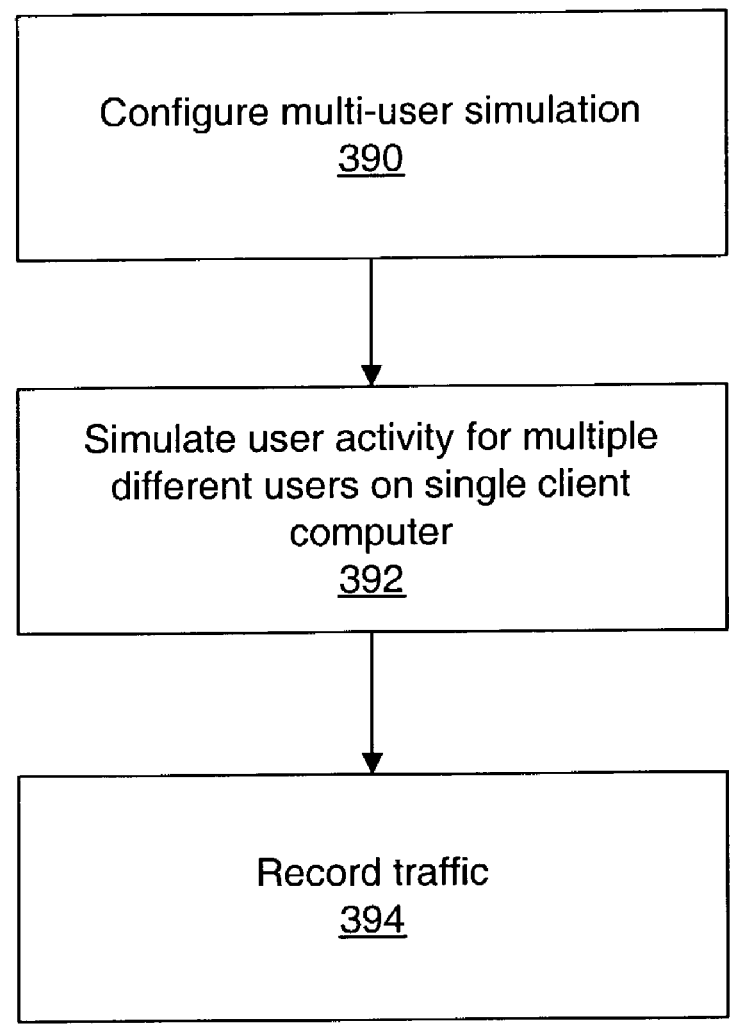
FIG. 3 illustrates one embodiment of a method for simulating multiple users that initiate Internet requests.

FIG. 3 illustrates one embodiment of a method for simulating multiple users that initiate Internet requests. In one embodiment, the method may include accessing configuration data and creating a multi-user simulation based on the configuration data, as indicated in 390. For example, a configuration data file may be accessed to obtain data that may be used to configure the multi-user simulation. The simulation method may be performed from a single client computer that is configured to access these components via an Internet/Intranet.

The configuration data may specify conditions and other data associated with one or more simulations. For example, in one embodiment, the configuration data may specify a number of users, Internet requests (e.g., Internet addresses such as URLs, server identifier, Web service provided by a particular server, etc.), login identifiers, access permissions, authentication methods, user profiles, etc. In other embodiments, the configuration data may specify one or more scripts that may be run to simulate a large number of users. For example, a script may indicate how many users should be simulated and associated Internet requests for those users, and the script may be repetitively read to generate input to a browser to simulate the indicated number of users.

The method may be performed on a single client computer mimicking user activity for multiple different users, as indicated in 392. Internet requests may be generated (as a simulation of multiple users initiating Internet requests) to components (e.g., an application server, legacy system, dynamic Web content). In one embodiment, the multi-user simulation method operating from a single client computer may simulate user activity of components within a client tier of a multi-tier architecture. In other embodiments, Internet requests may be generated to resources of a computer system that is based on a two-tier or multi-tier architecture. For example, the method may mimic multiple users (e.g., clients within a client tier) accessing one or more servers in a middle tier via Internet browsers.

A browser may be invoked to appear as multiple users simultaneously initiating Internet requests from separate user environments. In one embodiment, a standard Internet browser (e.g., Internet Explorer or Netscape Navigator) may be used as the browser. The browser may appear as multiple, separate users initiating Internet requests from multiple, different user environments (e.g., a user environment for one user, another user environment for a different user, etc.). Conversely, the browser may appear as multiple users simultaneously initiating Internet requests from the same user environment and/or with multiple sessions. Thus, from a single platform, the simulation method may include simulating multiple Internet requests from separate users operating multiple browsers on multiple desktop computers.

The method may include monitoring the Internet traffic of each user environment separately and recording the Internet traffic, as indicated in 394. For example, one embodiment may include recording or journaling the traffic flow that occurs between clients and servers. An embodiment may include simulating user activity (users initiating Internet requests via browsers) and recording requests and responses to the requests. As various users are simulated, capturing of the traffic flow and outputting results data for each simulation may be performed. The results data may be used to obtain information regarding the different conditions present during a simulation.

A Web service may be tested under conditions that are present as part of a simulation. An embodiment may include simulating multiple users initiating Internet requests using multiple, different platforms. For example, an application server may operate on a Sun platform and a Web server may operate on a Windows NT platform. Varied conditions may affect correct responses to the Internet requests. The simulation method may include initiating Internet requests from multiple users using multiple, different protocols, methods and/or mechanisms.

The simulation method may generate user activity as indicated by the configuration data to verify that components of an Internet-based system operate correctly under various conditions. These conditions may be changed which may affect correct responses to Internet requests. A large number of users may be needed to exercise a server's ability to simultaneously handle multiple Internet requests involving different types of Web content and the simulation method may mimic those users operating in separate user environments. User requests using different types of transfer protocols interacting with a browser may be generated to simulate user activity under various conditions.

Figure 4:
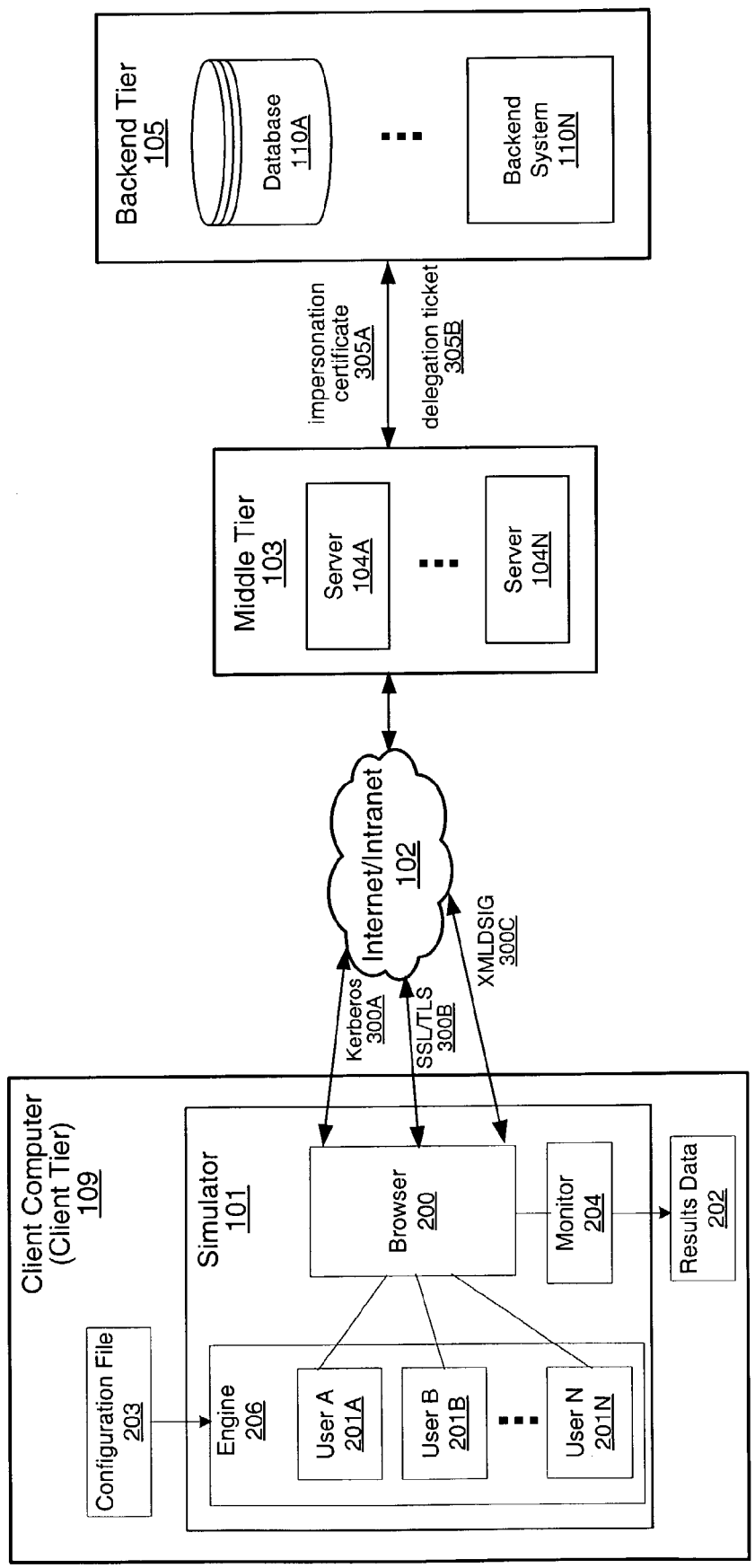
FIG. 4 illustrates one embodiment of a simulator configured to simulate multiple, separate users that are identified by different authentication methods.

FIG. 4 illustrates one embodiment of simulator 101 configured to simulate multiple, separate users that each rely on one or more different authentication methods 300. An authentication process may be used to grant a user access to secure components (e.g., server 104) based on a user's identity (e.g., password or some other evidence associated with the user). In one embodiment, simulator 101 may be configured to simulate multiple, separate users that rely on various authentication methods 300 to grant each user access to secure components within the middle tier 103 (e.g., server 104) and/or backend tier 105 (e.g., database 110A) based on the user's identity. For example, the simulator 101 may simulate multiple users initiating Internet requests using Kerberos 300A, Secure Sockets Layer/Transaction Layer Security (SSL/TLS) 300B, XML Digital Signature (XMLDSIG) 300C authentication methods or some other authentication method to issue an identity for each user. Basic, digest and Integrated Windows Authentication are other exemplary authentication methods that the simulator 101 may be configured to use.

Client authentication may involve identification of each user that is initiating Internet requests from the client tier. The simulator 101 may be configured to test proper verification of the identity of each user desiring access (e.g., one or more users desiring access may be specified in configuration data 203) against credentials (e.g., the identity) a user may acquire during an authentication process which is associated with the user. Various techniques may be used by the authentication methods 300 to generate the credentials (e.g., passwords, biometric techniques, smart cards, certificates, tickets, cookies, etc.). These credentials may be used to automatically pass Internet requests through a security gate. For example, the simulator 101 may be configured to simulate multiple users that initiate Internet requests using different authentication methods 300. The different authentication methods 300 may generate, present and validate credentials to confirm each user's identity and confirm that the user has a valid credential to gain secure access. A client, for example, may automatically perform an authentication process every time a user initiates a secure Internet request.

A simulator 101 may be configured to simulate separate users as if each of the users is operating within a different user environment, e.g., as if each user has logged into the user's own desktop environment. The simulator 101 may be configured to mimic user activity involving a server 104 requiring a user name and password, for example, before granting a user 201 access to the server 104. The server 104 may maintain and/or access data (e.g., from a directory service) identifying valid user names and passwords. If a particular name is found in the data, and if the simulation involves a correct password for the user, the server 104 may grant access to the user 201 and issue the user an identity (e.g., credentials). The identity may be stored in a browser's cache memory separately for each user, for example, and used for following authentication processes for the users. In one embodiment, the simulator 101 may be configured to simulate user activity that also includes storing credentials associated with each user and using the stored credentials for following authentication processes for the user. In one embodiment, the monitor 204 may be configured to record authentication traffic, including any failure indications, in the results data 202. For example, as part of a simulation, one authentication method 300 may allow a user to authenticate to a server 104 and another authentication method 300 may fail to allow a user to authenticate to a server 104.

In one embodiment, the simulator 101 may also be configured to simulate user activity involving client authentication based on certificates 305A as the credentials. A certificate is an electronic document used to identify an individual, a server, a company, or some other entity and to associate that identity with a public key (e.g., number used to encrypt and/or decrypt information). Use of a certificate may address security issues with impersonation which may occur when data passes to a person that poses as the intended recipient (e.g., a person can pretend to be someone else). Commonly referred to as impersonation, the certificate 305A may have identity information about a user, and limited or no information about a server. In addition to a public key, a certificate may include the name of the entity it identifies, an expiration date, the name of a certificate authority (e.g., directory service) that issued the certificate, a serial number, and other information. For example, the simulator 101 may be configured to simulate multiple users and each user may be identified by a certificate that includes a public key, the name of the certificate authority that issued the certificate, a serial number, etc. This data (e.g., entity name, serial number, expiration date, etc.) may be credentials for each user and may be stored or generated during a simulation by the simulator 101. As simulated by the simulator 101, after a user has been authenticated and has received an identity (e.g., credentials in form of a certificate 305A), the certificate 305A may then be used by a server 104 to act on behalf of a user 201.

In one embodiment, the simulator 101 may also be configured to simulate user activity involving server authentication based on tickets 305B as the credentials. A user may delegate authority to a server to act on the user's behalf. Commonly referred to as delegation, the ticket 305B may be a certificate that also includes identity information of a server. Other servers may then use this identity information during authentication to decide if the authentication should be accepted. For example, a site (e.g., specific location on World Wide Web) might be willing to accept a ticket for authentication if the ticket came from a server at the same site. The simulator 101 may be configured to simulate user activity involving authentication based on delegation using tickets 305B. For example, the simulator 101 may be configured to simulate a user logging in and delegating authority to act on the user's behalf. In one embodiment, the simulator 101 may be configured to record Internet traffic in the results data 202. For example, the monitor 204 may be configured to record traffic from a Web server 104 accessing a different server 104 for the purpose of initiating an Internet request on behalf of a user that originally accessed the Web server 104.

Authentication may ensure that an individual is the individual claimed to be regardless of access privileges of the individual. For example, once a user has been properly authenticated, the user's ability to read, modify, create and destroy (exemplary access privileges) components (e.g., delete data in a database 110A) may be determined separately by an associated permissions matrix for the user. Authorization may be the process of determining whether an identity (plus a set of attributes associated with that identity) is permitted to perform some action. Authorization may involve finding out if the user, once identified, is permitted to access the component. This is usually determined by finding out if that user is a part of a particular group or has a particular level of security privileges. In one embodiment, the simulator 101 may be configured to simulate multiple users initiating Internet requests with various access privileges. For example, a server 104 may maintain data (e.g., a directory service) identifying valid access privileges for each user 201 that is part of a simulation. Once authenticated, the data may also indicate to the server 104 if a user 201 is authorized to access appropriate components (e.g., data in a database 110A). In one embodiment, the simulator 101 may be configured to record corresponding traffic in the results data 202. For example, the monitor 204 may be configured to record an indication if a user's credentials are sufficient to access multiple, different servers 104 such as a Sun ONE portal server or a Windows .Net application server. In one embodiment, the indication may be specified as a pass/fail symbol. In other embodiments, the indication may be specified by text that shows a pass or fail (e.g., yes or no as text in the results data 202).

The simulator 101 may be configured to enable a developer to verify that components operate correctly under various conditions such as different authentication methods, different credentials and different access privileges. A developer may change these conditions which may affect correct responses to Internet requests by specifying, for example, different authentication methods and different access privileges in the configuration data 203. In one embodiment, the simulator 101 may simulate multiple users initiating Internet requests using Kerberos 300A and XML Digital Signature (XMLDSIG) 300C authentication methods. The simulator 101 may simulate multiple users impersonating and/or delegating credentials (certificates 305A and tickets 305B) to components such as server 104 and backend system 100N. In other embodiments, the simulator 101 may also be configured to simulate multiple users initiating Internet requests based on valid access privileges.

A developer may use the simulator 101 to test components under conditions that are present as part of a simulation. Thus, the simulator 101 may be configured to simulate multiple users initiating Internet requests using multiple, different platforms in combination with, or separate from, the various embodiments described with FIG. 4. For example, a server 104 may operate on a Sun platform, another server 104 may operate on a Windows NT platform and each of those platforms may use different authentication methods. Each of the components (e.g., server 104) operating on those platforms may authorize each of the multiple users (as simulated by the simulator 101) to have different access privileges. Thus, the simulator 101 may be configured to test under conditions as specified in the configuration data 203 from a single client platform 109.

Figure 5:
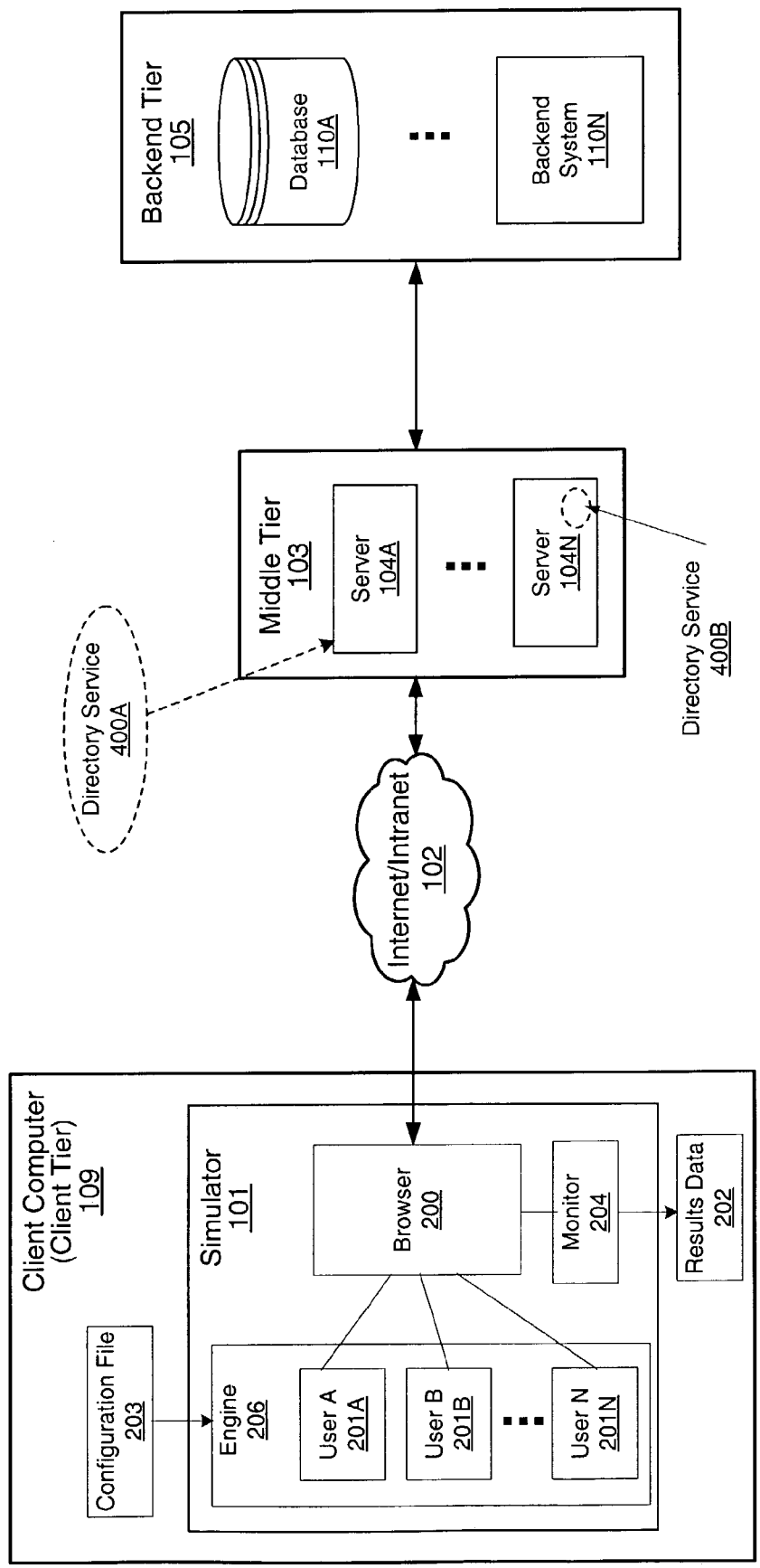
FIG. 5 illustrates one embodiment of a simulator configured to simulate multiple, separate users that are identified by different directory services.

Authentication and authorization methods used to validate a user's identity and access privileges may vary depending on policies (e.g., verification procedures) of a given certificate authority (e.g., directory service). Methods may vary depending on which component (e.g., server 104) is issuing an identity (e.g., certificate) and the purpose for which the identity will be used. Before issuing a certificate, for example, the certificate authority may use its verification procedures for that type of certificate to confirm a user's identity. The certificate issued by the certificate authority may bind a particular public key to the name of the entity the certificate identifies (e.g., a user or a server). FIG. 5 illustrates one embodiment of a simulator 101 that may be configured to simulate multiple, separate users that each rely on one or more directory services 400. A directory service 400 may be a repository for information about network-based entities such as applications, files, printers and users. A directory service 400 may provide a consistent way to name, describe, locate, access, manage, and secure information about these entities. For example, a directory service 400 may store usernames, passwords, access permissions, computer identifiers and domain memberships. A directory service 400B may be located on the same platform as the server 104 or may be located on a separate site (e.g., a different location on World Wide Web) as illustrated by directory service 400A. Most directory services 400 support multiple clients communicating to a directory server over a network.

In one embodiment, the simulator 101 may be configured to simulate user activity involving different directory services 400 such as Active Directory supported by Microsoft and Netscape Directory Service supported by Netscape. The simulator may simulate multiple users initiating Internet requests using multiple, different directory services 400. Active Directory, for example, is a directory service that may connect directories across a network (analogous to a big phone book of users) and the simulator 101 may be configured to simulate users initiating Internet requests that may rely on authentication processes involving Active Directory. Microsoft Metadirectory Services (MMS) is another exemplary directory service that centrally stores and integrates identity information from multiple directories and the simulator 101 may be configured to simulate users initiating Internet requests that may rely on authentication processes involving MMS. Other directory services that may be present during a simulation of multiple users by the simulator 101 may include a Sun ONE application server supporting Lightweight Directory Access Protocol (LDAP), Passport, Liberty or other directory services 400 as indicated by data specified in the configuration data 203. An application server developed using Sun ONE development tools and supporting LDAP may access Sun ONE directory and identity servers, for example. Passport is an authentication server developed by Microsoft that provides a common Internet authentication mechanism across participating Web sites. Kerberos works by providing principals (e.g., users or Web services) with tickets that can be used to identify the principals to other principals and secret cryptographic keys for secure communication with other principals. These tickets may then be embedded in other network protocols thereby allowing the processes implementing that protocol to be sure about the identity of the principals involved. The principals may be authenticated using a Key Distribution Center (KDC, Kerberos Server). Liberty is a federated network identity solution for the Internet developed by the Liberty Alliance Project. A federated network identity model may enable businesses or users to manage their own data and may ensure that the use of critical personal information is managed and distributed by appropriate parties rather than a central authority such as MMS.

A domain may be an administrative unit of a directory service which indicates a group of computers are administered as a unit. A directory service 400 may store domain memberships, for example. In one embodiment, the simulator 101 may be configured to simulate user activity involving different users configured in different domains. For example, the simulator may simulate multiple users initiating Internet requests with each user configured as part of a different domain of directory services 400. A domain may be a logical grouping of network servers and other computers that may share common security and user account information. Computers in a single domain may share physical proximity on a small LAN or may be located in different areas of the world communicating over a number of physical connections including the Internet, dial-up lines, Integrated Services Digital Network (ISDN), fiber, Ethernet, Token-Ring, frame relay, satellite, etc. Read and search access to a directory service 400 may be restricted to a specific IP address, subnet, or domain name, for example. The simulator 101 may be configured to simulate user activity involving different users with access restricted to a specific domain. For example, the simulator 101 may simulate a user attempting to authenticate with a directory service 400 that the user is restricted from or enabled to access (e.g., user is configured to access Web pages within a domain via an Intranet). Thus, the simulator 101 may test under conditions such as Internet versus Intranet access.

When a user that is being simulated initiates access to Active Directory for the purpose of authentication, for example, an Active Directory server (e.g., domain controller which may be a server in a domain that accepts account logons and initiates authentication) may be located by a mechanism called the domain controller locator. A client (as part of a simulation of multiple users) may attempt to discover (e.g., look up and identify) a domain controller for the specified domain. For example, the simulator 101 may be configured to generate and send authentication requests (e.g., simulate multiple users that are attempting to authenticate by logging on to a domain successfully) to a server 104. As part of the authentication processes, a client (as simulated by the simulator 101) may discover a domain controller such as an Active Directory server and use the Active Directory server to grant access to secure components) before initiating Internet requests. A domain may identify both the user and the client computer (e.g., user account and computer identifier such as IP address for the computer). A local mechanism of an operating system (e.g., Net Logon service from Microsoft) may cache domain controller information (e.g., user account and IP address) so that subsequent Internet requests may eliminate repeating the domain controller discovery process. Caching this information may encourage consistent use of the same domain controller and thus, consistent access to Active Directory, for example. In one embodiment, the simulator 101 may be configured to store data such as domain controller information and other desktop information (e.g., variables for a particular user environment such as operating system, user policies, etc.) that are part of a simulation involving different domain controllers (e.g., Active Directory).

The simulator 101 may be configured to simulate multiple users operating in multiple desktop environments (e.g., different operating systems and/or different directory services 400 for each user environment) initiating Internet requests to different servers 104 (e.g., Web servers). For example, from the single platform 109 the simulator 101 may be configured to simulate separate Windows XP desktops configured as a member of a Windows 2000 or .Net domain. In one embodiment, the simulator 101 may be configured to simulate multiple users initiating Internet requests for which user accounts and computer identifiers may both be stored and accessed on the same or different domain controllers, each user account has access to a different directory service, or each user account has access to a different directory service on the same or different platform.

In one embodiment, the simulator 101 may be configured to simulate multiple users relying on various policies (e.g., verification procedures) that may be created when a user logs in (e.g., created when the simulator 101 creates each user environment). In one embodiment, the simulator 101 may be configured to simulate user activity under different domain membership conditions to identify or simulate behavioral changes of these various environments and servers 104 (e.g., Web servers) under those conditions. During a simulation of multiple users initiating Internet requests, the simulator 101 may generate and send Internet requests (e.g., requests for each user appearing to operate in a separate desktop environment) from the browser 200 to a server 104 and capture the response to the browser 200. The Internet request from a user that is being simulated (e.g., the browser 200 appears as an Internet Explorer browser operating in a Windows XP desktop that is configured in a Windows 2000 domain) may return a different response than another user that is being simulated (e.g., the browser 200 appears as an Internet Explorer browser operating in a Windows XP desktop that is configured in a Windows .Net domain). In one embodiment, the simulator 101 may access the domain controller information (e.g., Windows XP desktop identified by IP address stored in domain controller) that is maintained by the simulator 101. A developer may determine based on the traffic flow, for example, that a particular desktop may interact incorrectly with a particular server 104. Such traffic flow (e.g., requests and responses to the requests) may be used to identify if the behavior of these various desktops and servers 104 correctly change under different domain memberships, for example.

In one embodiment, the simulator 101 may be configured to record the credentials used during an authentication process and credentials returned by an authentication process in the results data 202. In some embodiments, the monitor 204 may be configured to record a failure indication in the results data 202 if a user 201 fails to authenticate to a server 104 and/or a component 110 in the backend tier 105 fails to provide access to a user 201. In one embodiment, the simulator 101 may be configured to distinguish between Internet access and Intranet access and the monitor 204 may be configured to record a failure indication in the results data 202 if a user 201 fails to access a component 110 in the backend tier 105 under different Internet and/or Intranet access conditions.

In one embodiment, the simulator 101 executing on a single client computer 109 may be configured to simulate multiple users operating in multiple desktop environments (e.g., different operating systems or different logins to same operating system). The simulator 101 may also simulate multiple users initiating Internet requests using multiple, different directory services 400. For example, the simulator 101 may be configured to simulate multiple users initiating Internet requests from separate Windows XP desktops (e.g., user environments) relying on Passport directory service 400A for authentication. In one embodiment, the simulator 101 may be configured to simulate user activity under different server 104 (e.g., Web server) conditions to identify if the interaction between the browser 200 and server 104 changes under those conditions. For example, depending on which server 104 is used in the middle tier 103, behavior of the browser 200 may change. A particular server 104, for example, a Sun ONE Web server receiving an Internet request from a user that is being simulated (e.g., the browser 200 appears as an Internet Explorer browser operating in a Windows XP desktop environment), may fail to provide access to a user 201. A developer may determine based on the traffic flow, for example, whether or not a particular browser operating on a particular desktop interacts correctly with a particular server 104. The Sun ONE Web server 104 may fail to provide access, for example, because the Sun ONE Web server 104 may process the Internet requests from a particular browser incorrectly. The desktop may be configured to rely on data, for example, that the server 104 may manipulate incorrectly. The monitor 204 may be configured to record a failure indication in the results data 202 if a component (e.g., Web server) fails to provide access to a user 201.

Figure 6:
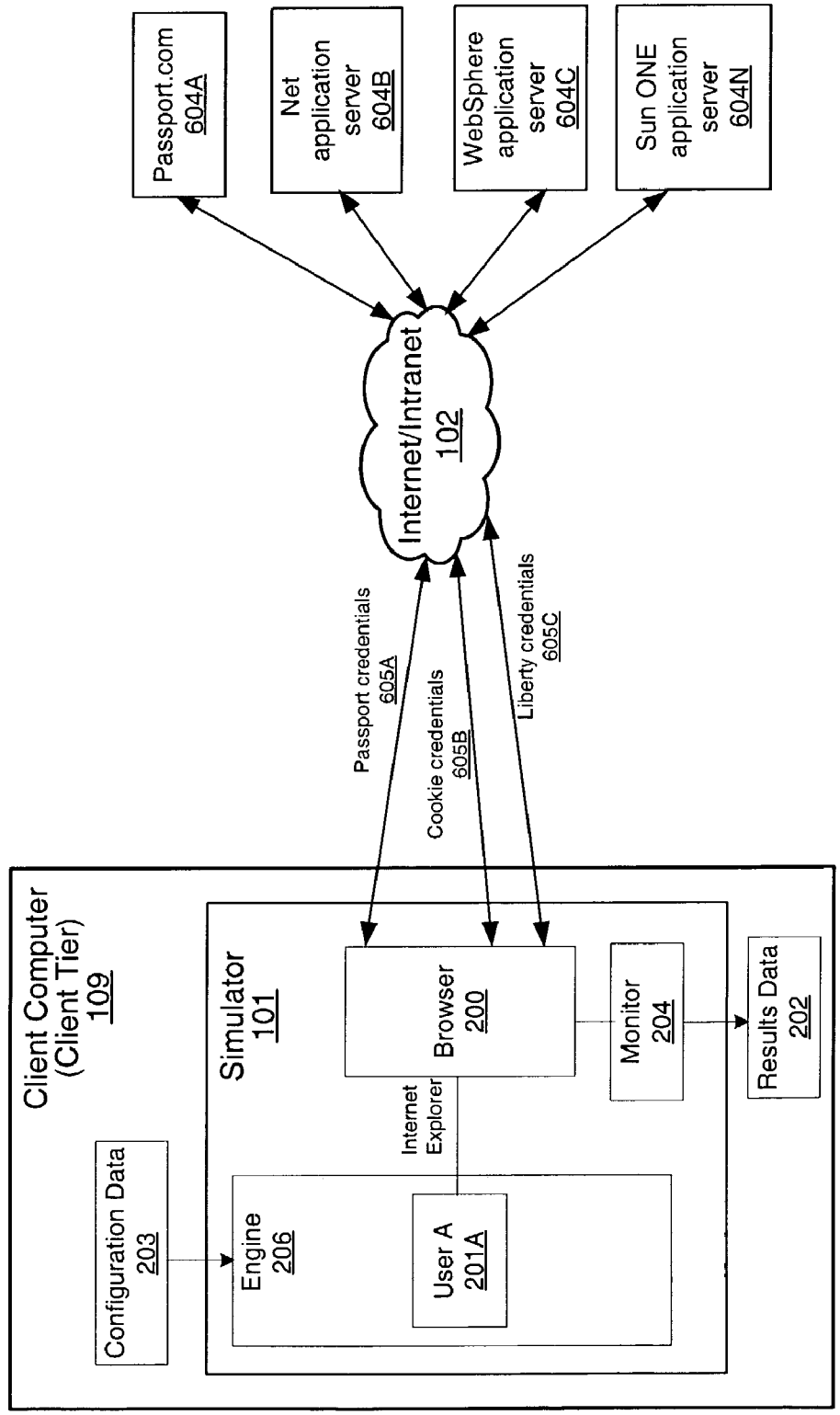
FIG. 6 illustrates one embodiment of a simulator configured to simulate a user's activity involving multiple, different credentials.

Various techniques may be used by each authentication method 300 to generate credentials (e.g., passwords, biometric techniques, smart cards, certificates, tickets, cookies, etc.). These credentials may be used to automatically pass Internet requests through a security gate. For example, the simulator 101 may be configured to simulate from a single client machine 109 multiple users initiating Internet requests using multiple, different credentials that verify each user has valid access to secure components (e.g., server). FIG. 6 illustrates one embodiment of a simulator 101 that may be configured to simulate user activity involving multiple, different users with each user relying on multiple, different credentials for accesses to different types of servers. Although only a single user 201A is shown for clarity, multiple, different users may be simulated, each using different credentials. Simulator 101 may create a simulation in which, after a user (e.g., User A) has been authenticated and has received an identity (e.g., the browser 200 sends an Internet request to a Passport.com server 604A and the Passport.com server returns Passport credentials 605A), the simulator 101 may store the Passport credentials 605A. The user 201A (e.g., User A) may receive a cookie credential 605B, a Liberty credential 605C, or some other type of credential 605 during subsequent, separate authentication processes (e.g., the browser 200 sends other Internet requests to a .Net application server 604B and a WebSphere application server 604C).

Credentials may be reused to access different sites. For example, the simulator 101 may be configured to simulate multiple users being authenticated by different sites which may each use a credential created during a prior authentication process for a different site. A site may reuse a previously created credential or may create a new credential. The simulator 101 may simulate each user 201 initiating Internet requests from multiple, different sites with each site requiring authentication and each site using different authentication methods. A developer may determine based on the traffic flow output from the simulator 101, for example, that a particular browser operating on a particular desktop may interact incorrectly with a particular server 604. For example, through a simulation a test engineer may be able to determine that a Sun ONE application server 604 may fail to provide access, for example, because the Sun ONE application server 604N may process the Internet requests from a particular browser incorrectly or may process requests from a particular user environment incorrectly, as simulated by simulator 101 from the single platform 109. A desktop may be configured to rely on data, for example, that the Sun ONE application server 604N may manipulate incorrectly. In one embodiment, the monitor 204 may be configured to record traffic or failure indications in the results data 202.

Figure 7:
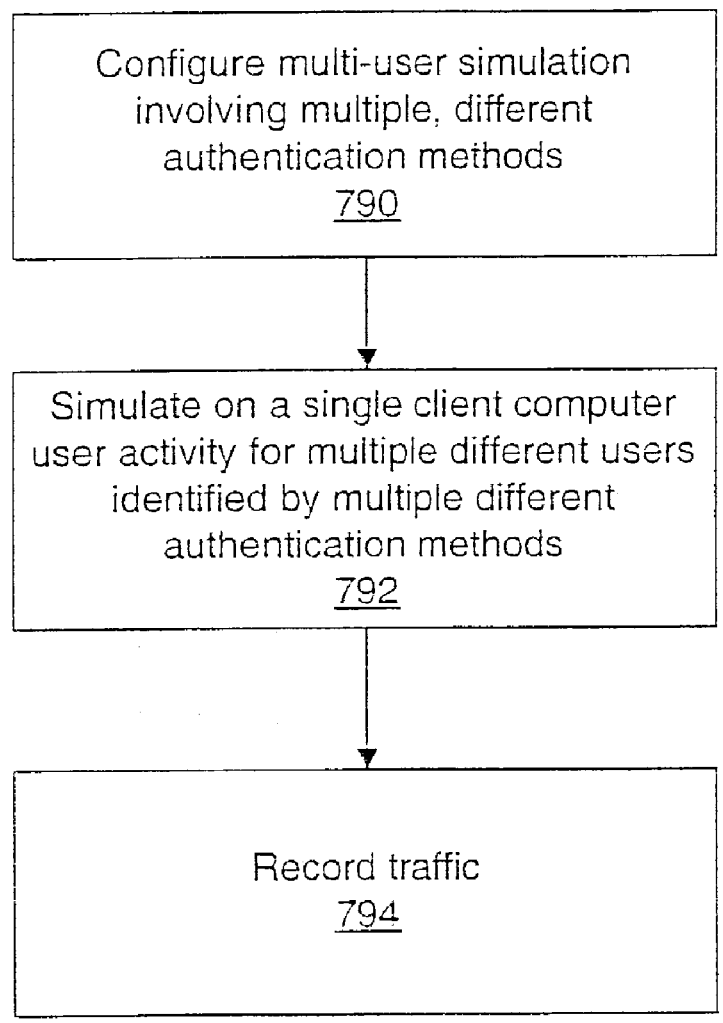
FIG. 7 illustrates one embodiment of a method for simulating multiple users that initiate Internet requests using different authentication methods.

FIG. 7 illustrates one embodiment of a method for simulating multiple users initiating Internet requests using multiple different authentication methods. In one embodiment, the method may include accessing configuration data and creating a simulation involving user requests as indicated by the configuration data. The simulation may involve multiple, different authentication methods, as indicated in 790. For example, the configuration data file may be read to obtain data that may be used to configure a multi-user simulation using several different authentication mechanisms or protocols.

The simulation process may be performed on a single client computer that is configured to access components or servers via an Internet/Intranet.

The configuration data may specify conditions and other data associated with one or more simulations. For example, in one embodiment, the configuration data may specify a number of users, Internet requests (e.g., URLs for Web service provided by a particular server, etc.), authentication methods, etc. In other embodiments, the configuration data may specify one or more scripts that may be followed by the simulation method for a number of users. For example, a script may indicate how many users should be simulated and associated Internet requests and authentication techniques for those users. The configuration data may be repetitively read data (e.g. a script) to simulate multiple users using various authentication methods through a browser on a single platform.

The simulation process may mimic user activity for multiple different users identified by multiple different authentication methods, as indicated in 792. In one embodiment, a simulation running from a single client computer may simulate user activity of components within a client tier of a multi-tier architecture. For example, the simulation may mimic multiple users (e.g., clients within a client tier) accessing one or more servers in a middle tier via Internet browsers. The simulation may generate Internet requests (as a simulation of multiple users that initiate Internet requests) to components (e.g., an application server, legacy system, dynamic Web content). In one embodiment, the components may be resources of an Internet-based system that is based on a three-tier architecture. In other embodiments, the simulation may generate the Internet requests to resources of a system that is based on a two-tier or multi-tier architecture.

Through a browser, the simulation may create the appearance of multiple users simultaneously initiating Internet requests from separate user environments. In one embodiment, the simulation may invoke an off-the-shelf or standard Internet browser (e.g., Internet Explorer or Netscape Navigator) as the browser. In one embodiment, the simulation may generate traffic simulating multiple, separate users that are each identified by Kerberos, Secure Sockets Layer/Transaction Layer Security (SSL/TLS), XML Digital Signature (XMLDSIG) authentication methods or some other authentication method that issues an identity (e.g., biometric techniques, smart cards, certificates, tickets, cookies) for each user.

The simulation may be used to test the verification of the identity of each user desiring access (e.g., one or more users desiring access may be specified in the configuration data) against credentials (e.g., the identity) a user may acquire during an authentication process which is associated with the user. In one embodiment, the simulation may simulate user activity involving client authentication based on certificates as the credentials. The simulation may mimic users initiating Internet requests and each user may be identified by a certificate that includes a public key, the name of the certificate authority that issued the certificate, a serial number, etc identified by a public key, the name of the certificate authority that issued the certificate, a serial number, etc. This data (e.g., entity name, serial number, expiration date, etc.) may be credentials for each user and may be stored during a simulation by the simulator. A simulation may be created to exercise or test a system in which, after a user has been authenticated and has received an identity (e.g., credentials in form of a certificate), the certificate may then be used by a server to act on behalf of a user.

In one embodiment, the simulation may simulate user activity involving server authentication based on tickets as the credentials. A user may delegate authority to a server to act on the user's behalf. The simulation may simulate user activity involving authentication based on delegation using tickets. For example, the simulation may simulate a user logging in and delegating authority to components (e.g., a server) to act on the user's behalf.

In one embodiment, the simulation may simulate multiple users initiating Internet requests based on valid access privileges. For example, a server may maintain data (e.g., a directory service) identifying valid access privileges for each user that is part of a simulation. Once authenticated, the data may also indicate to the server if a user is authorized to access appropriate components (e.g., delete data in a database 11A).

The simulation may simulate multiple users operating in multiple desktop environments (e.g., different operating systems and different directory services 400 for each user environment) initiating Internet requests to different servers (e.g., Web servers). For example, the simulation may simulate separate Windows XP desktops configured as a member of a Windows 2000 or .Net domain. In one embodiment, the simulation may simulate multiple users relying on various policies (e.g., verification procedures) that are typically created when a user logs in (e.g., created when the simulator creates each user environment). In one embodiment, the simulation may simulate user activity under different domain membership conditions to identify if the behavior of various servers (e.g., Web servers) correctly change under those conditions.

In one embodiment, the simulation runs on a single client computer and may simulate multiple users operating in multiple desktop environments (e.g., different operating systems or different logins to same operating system). The simulation may also simulate those same multiple users initiating Internet requests using multiple, different directory services that are present in a middle tier, for example. For example, the simulation may simulate multiple users initiating Internet requests from separate Windows XP desktops (e.g., user environments) relying on Passport directory service for authentication. In one embodiment, the simulation may simulate user activity under different conditions to identify if the interaction between the browser and server correctly changes under those conditions. A developer may wish to verify if a particular server, for example, a Sun ONE Web server receiving an Internet request from a user that is being simulated (e.g., the browser appears as an Internet Explorer browser operating in a Windows XP desktop environment), correctly provides access to a user.

Various techniques may be used by each authentication method to generate credentials (e.g., passwords, biometric techniques, smart cards, certificates, tickets, cookies, etc.). These credentials may be used to automatically pass Internet requests through a security gate. For example, the simulation may simulate multiple users initiating Internet requests using multiple, different credentials that verify each user has valid access to secure components (e.g., server). After a simulated user (e.g., User A) has been authenticated and has received an identity (e.g., the browser sends an Internet request to a Passport.com server and the Passport.com server returns Passport credentials), the simulation may record the Passport credentials. The simulation may simulate multiple users being authenticated by different sites which may each use a credential created during a prior authentication process for a different site. The simulation may simulate each user initiating Internet requests from multiple, different sites with each site requiring authentication and each site using different authentication methods.

In one embodiment, the simulation method may include monitoring or recording Web traffic during a simulation, as indicated in 794. In one embodiment, a failure indication may be recorded in results data if a user fails to authenticate to a server. For example, as part of a simulation, one authentication method may allow a user to authenticate to a server and another authentication method may fail to allow a user to authenticate to a server. In one embodiment, the simulation may record Internet traffic in results data. For example, the traffic may be recorded if a Web server accesses a different server for the purpose of initiating an Internet request on behalf of a user that originally accessed the Web server 104. In one embodiment, may include recording an indication in the results data if a user's credentials are sufficient to access multiple, different servers such as a Sun ONE portal server or a Windows Net application server. In one embodiment, the indication may be specified as a pass/fail symbol. In other embodiments, the indication may be specified by text that shows a pass or fail (e.g., yes or no as text in the results data).

During a simulation of multiple users initiating Internet requests, the simulation may generate and send Internet requests (e.g., requests for each user appearing to operate in a separate desktop environment) from a browser to a server and capture the response to the browser. The Internet request from a user that is being simulated (e.g., the browser 200 appears as an Internet Explorer browser operating in a Windows XP desktop that is configured in a Windows 2000 domain) may return a different response than another user that is being simulated (e.g., the browser appears as an Internet Explorer browser operating in a Windows XP desktop that is configured in a Windows .Net domain). A developer may determine based on the traffic flow, for example, that a particular desktop may interact incorrectly with a particular server. Such traffic flow (e.g., requests and responses to the requests) may be used to identify if the behavior of these various desktops and servers change under different domain memberships, for example.

In one embodiment, the simulation method may include recording the credentials used during an authentication process and credentials returned by an authentication process in the results data. In some embodiments, a failure indication may be recorded in results data if a user fails to authenticate to a server and/or a component (e.g., a database) in the backend tier fails to provide access to a user. In one embodiment, the simulation may distinguish between Internet access and Intranet access and record a failure indication in the results data if a user fails to access a component in the backend tier under different Internet and/or Intranet access conditions.

A developer may determine based on the traffic flow, for example, that a particular browser operating on a particular desktop may interact incorrectly with a particular server. The Sun ONE Web server may fail to provide access, for example, because the Sun ONE Web server may process the Internet requests from a particular browser incorrectly. The desktop may be configured to rely on data, for example, that the server may manipulate incorrectly. The a failure indication may be recorded in results data if a component (e.g., Web server in the middle tier) fails to provide access to a user.

A developer may determine based on the traffic flow recorded by the simulation, for example, that a particular browser operating on a particular desktop may interact incorrectly with a particular server because of conflicting use of multiple credentials. An application server may fail to provide access, for example, because the application server may process the Internet requests from a particular browser incorrectly. In one embodiment, a failure indication may be recorded in results data if a component (e.g., WebSphere application server in the middle tier) fails to provide access to each user.

The embodiments described above may be configured to simulate multiple users initiating Internet requests in multiple, different platforms (e.g., different operating systems or different logins to same operating system) on a single client computer 109. The simulation may also simulate those same multiple users initiating Internet requests using multiple, different directory services, different authentication methods and different types of credentials. Any combination of the above embodiments may be simulated. For example, a developer may wish to test one type of server interacting with one type of browser under a specific condition (e.g., a specified number of users) and the simulator may be configured to simulate user activity under those conditions. A developer may wish to test various types of Web service technologies such as SOAP (Simple Object Access Protocol) and WSDL (Web Service Description Language) with different application servers in a middle tier and the simulator may be configured to simulate user activity to exercise such a system.

Figure 8:
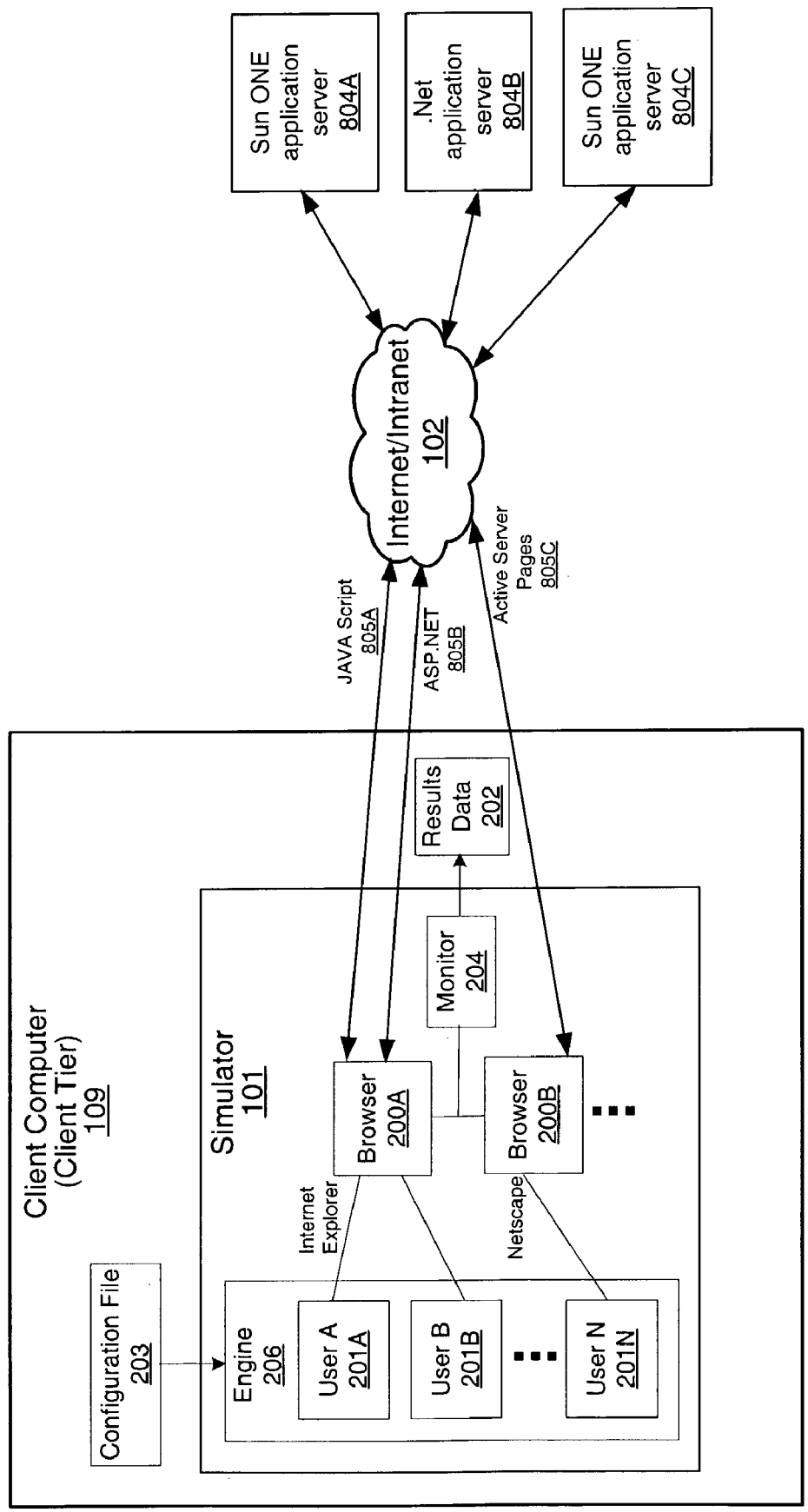
FIG. 8 illustrates one embodiment of a simulator configured to simulate multiple users initiating Internet requests for different types of active Web content from multiple, different browsers.

FIG. 8 illustrates one embodiment of a simulator 101 that may be configured to simulate multiple users initiating Internet requests with multiple, different browsers 200. FIG. 8 also illustrates an embodiment in which simulator 101 is configured to simulate multiple different users that each access different types of active Web content 805. In one embodiment, the simulator 101 may be configured to simulate users 201A and 201B using Internet Explorer browser 200A, user 201N using Netscape browser 200B and other users 201 using another type of browser 200 while accessing different types of active Web content 805. In one embodiment, the simulator 101 may be configured to simulate accessing active Web content developed with a Java script 805A, Active Server Pages (ASP) 805B, ASP.NET 805C, or some other Web programming language. For example, the simulator 101 may simulate multiple users initiating Internet requests using multiple, different application servers 804. Each application server 804, for example, may receive an Internet request from a browser 200 for active Web content developed with various technologies. Sun ONE application servers 804A and 804C may each provide active Web content based on a Java script 804A and Active Server Pages 804B. A NET application server 804B may provide active Web content based on ASP-.NET 805C. The simulator 101 may be configured to generate requests for the various types of active content. The configuration file 203 may be used to specify various requests. The simulator 101 may also be configured to send the requests from different types of browsers. This feature may be useful in verifying that a server correctly processes active content, since different types of browsers handle active content differently.

In a simulation each authenticated user may use a different browser to browse different sites and initiate Internet requests to each site. When the browser accesses active Web content or dynamic Web content, the browser may behave differently depending on the Web content. In one embodiment, the simulator 101 may be configured to simulate user activity under different active content conditions to identify if the interaction between the browser 200 and server 804 changes under those conditions. An Internet Explorer browser operating in a Windows XP desktop environment (as simulated by one embodiment of a simulator 101) may process particular active Web content (e.g., a Java script 805A) differently than another configuration. A developer may determine based on the traffic flow, for example, that a particular server 804 may interact incorrectly with a particular browser while processing a certain type of active Web content. The monitor 204 may be configured to record a failure indication in the results data 202 if a browser 200 as simulated in the client tier 109 fails to provide access to the user 201.

Figure 9:
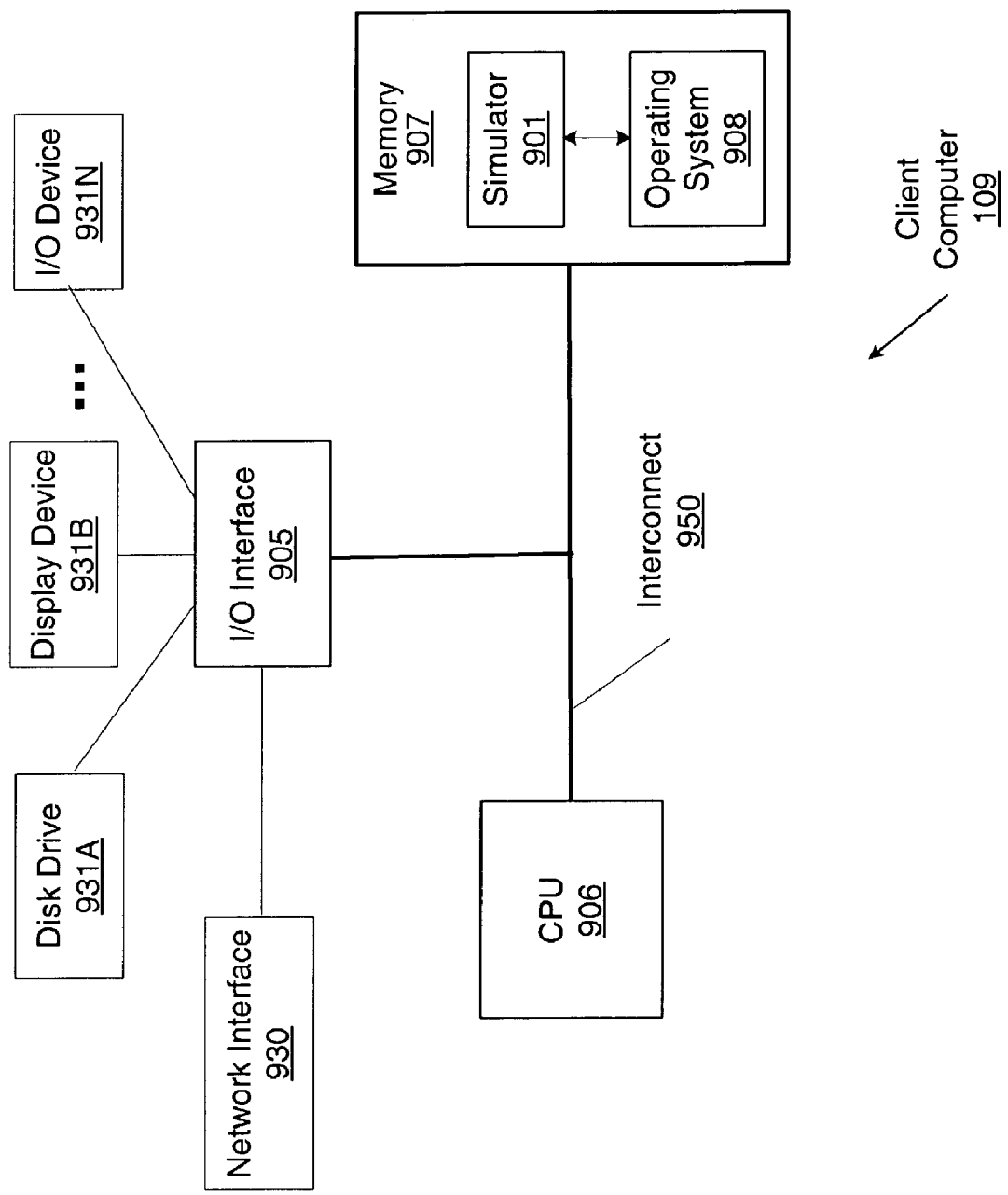
FIG. 9 illustrates a single computer system that may include one embodiment of a simulator.

FIG. 9 illustrates a single computer system 109 that may include one embodiment of a simulator 101. Computer system 109 may include many components such as memory 907, a central processing unit (CPU) or processor 906, an input/output (I/O) interface 905, operating system 908 and device interconnect 950. The client computer system 109 may rely upon interconnect 950 to communicate data from one component to another. For example, interconnect 950 may be a point-to-point interconnect, a shared bus, and/or a bus hierarchy including a system bus, CPU bus, memory bus and I/O buses such as a peripheral component interconnect (PCI) bus. Memory 907 may store program instructions accessed by the CPU 906. For example, instructions and data implementing a simulator 101 may be stored in memory 907.

Client computer system 109 may further include other software and hardware components such as an input/output (I/O) interface 905 that may be coupled to various other components and memory 907. For example, the I/O interface 905 may be coupled to a network interface 930 and various I/O devices 931 such as disk drive 931A and display device 931B. The CPU 906 may acquire instructions and/or data through the I/O interface 905. A client computer system 109 may include additional and/or other components than shown in FIG. 9 such as other CPUs, other display devices, track ball, mouse, keyboard, printer, scanner or other types of I/O devices 931 for use with client computer system 109.

Client computer system 109 may be a single personal computer system executing a simulator 101. In different embodiments, a client computer system 1 may take other forms, including a desktop computer, notebook computer, workstation, server, mainframe computer system, network appliance, network computer, Internet appliance, personal digital assistant (PDA), embedded device, smart phone, television system, another suitable device, or combinations thereof. In general, the term computer system may be broadly defined to encompass any device having a processor which executes instructions from a computer accessible medium.

The client computer system 109 may be configured to execute one or more computer programs stored on a computer accessible medium. The computer programs may include an operating system 908 and a simulator 101 that may each be stored in memory 907. The computer programs may include other system software, application software, utility software, applets, and/or any other sequence of instructions. An operating system typically performs basic tasks such as recognizing input from a keyboard, sending output to a display screen, keeping track of files and directories on a disk, and controlling I/O devices such as scanners and printers. In different embodiments, the operating system 908 may be Windows NT from Microsoft, Solaris from Sun Microsystems, or any other operating system suitable for client computer system 109.

The simulator 101 may be a software application, software program instructions, software package, etc. For example, the simulator 101 may be a stand-alone software application or may be included as part of another software package. The simulator 101 may be implemented in various ways. For example, the simulator 101 may include a command line interface or a graphical user interface (or both) for providing editing access to the results data and configuration data, as well as enabling input of test conditions for each scenario. The simulator 101 may be implemented using a variety of programming languages, including procedure-based techniques, component-based techniques, and/or object-oriented techniques, among others. For example, the simulator 101 may be a software application written with Java or C++ that outputs the results data as tab-delimited text files.

The simulator 101 may be stored on various computer accessible media. Examples of computer accessible media include hard disk storage, floppy disk storage, removable disk storage, flash memory or random access memory (RAM). Computer accessible media may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. Computer accessible media may include other types of memory as well, or combinations thereof. In addition, the computer accessible medium may be located in a first computer in which the computer programs are executed, or may be located in a second different computer which connects to the first computer over a network through one or more components such as network adapters. In the latter instance, the second computer may provide the program instructions to the first computer for execution.

Note that the flow charts described herein represent exemplary embodiments of methods. The methods may be implemented in software, hardware, or a combination thereof. The order of method may be changed, and various elements may be added, reordered, combined, omitted, modified, etc. For example in FIG. 3, a simulator may record traffic for a client (794) before, after or during simulation of another client (792).

Various modifications and changes may be made as would be obvious to a person skilled in the art having the benefit of this disclosure. Note also that the flow charts described herein do not necessary require a temporal order. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A single computer system, comprising:
one or more processors; and
a memory coupled to the one or more processors, wherein the memory is configured to store program instructions executable by the one or more processors to implement a simulator, wherein the simulator comprises:
a simulation engine configured to generate concurrent user activity for a plurality of different simulated users including a first user and a second user, wherein the concurrent user activity is generated according to the first user operating in a first user environment and the second user operating in a second user environment different from the first user environment; and
a first browser configured to receive the user activity from the simulation engine and send Internet requests to one or more destinations according to the user activity so that the Internet requests from the first browser simulate a plurality of different concurrent users for the one or more destinations.

2. The single computer system as recited in claim 1, wherein the simulation engine is configured to receive responses to the Internet requests through the first browser; wherein the simulation engine is configured to generate additional user activity in response to the responses for the multiple different concurrent users.

3. The single computer system as recited in claim 1, wherein the simulator further comprises a monitor, wherein the monitor is configured to record Internet traffic for each of the multiple users, wherein the Internet traffic comprises the Internet requests and responses to the Internet requests.

4. The single computer system as recited in claim 1, wherein the memory further comprises configuration data specifying configuration information for the simulator, wherein the simulation engine is further configured to read the configuration data and configure a multi-user Internet simulation based on the configuration data.

5. The single computer system as recited in claim 4, wherein the configuration data specifies the number of different concurrent users.

6. The single computer system as recited in claim 4, wherein the configuration data comprises a script for the user activity, for each of the multiple concurrent users.

7. The single computer system as recited in claim 1, wherein the simulation engine is further configured to generate user activity for a plurality of different user authentication methods so that corresponding Internet requests are sent from the first browser for the plurality of different concurrent users using the plurality of different authentication methods.

8. The single computer system as recited in claim 1, wherein the Internet requests include (a) an Internet request for active content provided using a first web programming language and (b) another Internet request for active content provided using a second web programming language, wherein the second web programming language differs from the first web programming language.

9. The single computer system as recited in claim 1, wherein the simulator further comprises a second browser, wherein the second browser is a different type from the first browser, and wherein the simulation engine is configured to generate user activity for both browsers so that the simulator sends Internet requests for multiple different concurrent users from a plurality of different types of browsers.

10. The single computer system as recited in claim 9, wherein the different types of browsers comprise Internet Explorer and Netscape Navigator.

11. The single computer system as recited in claim 1, wherein the first user environment is at least partially defined according to a network domain for the first user, and the second user environment is at least partially defined according to a different network domain.

12. The system as recited in claim 1, wherein the first user environment is at least partially defined by a set of one or more desktop settings of the first user, and wherein the second user environment is at least partially defined by a different set of one or more desktop settings of the second user.

13. The system as recited in claim 7, wherein the one or more destinations include a first destination and a second destination, wherein the plurality of authentication methods include a first authentication method and a second authentication method, wherein the Internet requests include (a) an authentication request from the first user to obtain access to the first destination according to the first authentication method, and (b) another authentication request from the second user to obtain access to the second destination using the second authentication method.

14. The system as recited in claim 7, wherein the one or more destinations include a first destination and a second destination, wherein the plurality of authentication methods include a first authentication method and a second authentication method, wherein the Internet requests include (a) an authentication request from the first user to obtain access to the first destination according to the first authentication method, and (b) another authentication request from the first user to obtain access to the second destination using the second authentication method.

15. The system as recited in claim 7, wherein the one or more destinations include a first destination and a second destination, wherein the Internet requests include (a) an authentication request from the first user to obtain access to the first destination using a credential obtained from the first destination, and (b) another authentication request from the first user to obtain access to the second destination using the credential.

16. A method, comprising:
generating concurrent user activity for a plurality of different simulated users including a first user and a second user, wherein the concurrent user activity is generated according to the first user operating in a first user environment and the second user operating in a second user environment different from the first user environment;
from a single browser receiving the user activity, sending Internet requests to one or more destinations according to the user activity so that the Internet requests from the single browser simulate a plurality of different concurrent users for the one or more destinations;
receiving responses to the Internet requests; and
recording Internet traffic comprising the Internet requests and responses.

17. The method as recited in claim 16, further comprising generating additional user activity in response to the responses to send additional Internet requests for the multiple different concurrent users.

18. The method as recited in claim 16, further comprising accessing configuration data specifying configuration information for a multi-user Internet simulation, wherein said generating comprises generating user activity according to the configuration data.

19. The method as recited in claim 18, wherein the configuration data specifies the number of different concurrent users.

20. The method as recited in claim 18, wherein the configuration data comprises a script for the user activity for each of the multiple concurrent users.

21. The method as recited in claim 16, wherein said generating comprises generating user activity for a plurality of different user authentication methods, and wherein said sending Internet requests comprises sending Internet requests from the single browser for the plurality of different concurrent users using the plurality of different authentication methods.

22. The method as recited in claim 16, wherein said generating comprises generating user activity for active content, and wherein said sending Internet requests comprises sending Internet requests from the single browser for the plurality of different concurrent users requesting different types of active content.

23. The method as recited in claim 16, wherein said generating comprises generating user activity for a second browser on the same computer as said single browser, wherein the second browser is a different type from said single browser, the method further comprising sending Internet requests for multiple different concurrent users from a plurality of different types of browsers on the same computer.

24. The method as recited in claim 23, wherein the different types of browsers comprise Internet Explorer and Netscape Navigator.

25. The method as recited in claim 16, wherein the first user environment is at least partially defined according to an operating system being used by the first user, and wherein the second user environment is at least partially defined according to a different operating system being used by the second user.

26. A computer accessible storage medium comprising program instructions, wherein the program instructions are executable to implement:
   generating concurrent user activity for a plurality of different simulated users including a first user and a second user, wherein the concurrent user activity is generated according to the first user operating in a first user environment and the second user operating in a second user environment different from the first user environment;
   from a single browser receiving the user activity, sending Internet requests to one or more destinations according to the user activity so that the Internet requests from the single browser simulate a plurality of different concurrent users for the one or more destinations;
   receiving responses to the Internet requests; and
   recording Internet traffic comprising the Internet requests and responses.

27. The computer accessible medium as recited in claim 26, wherein the program instructions are further executable to implement generating additional user activity in response to the responses to send additional Internet requests for the multiple different concurrent users.

28. The computer accessible medium as recited in claim 26, wherein the program instructions are further executable to implement accessing configuration data specifying configuration information for a multi-user Internet simulation, wherein said generating comprises generating user activity according to the configuration data.

29. The computer accessible medium as recited in claim 26, wherein said generating comprises generating user activity for a plurality of different user authentication methods, and wherein said sending Internet requests comprises sending Internet requests from the single browser for the plurality of different concurrent users using the plurality of different authentication methods.

30. The computer accessible medium as recited in claim 26, wherein said generating comprises generating user activity for a second browser on the same computer as said single browser, wherein the second browser is a different type from said single browser, the method further comprising sending Internet requests for multiple different concurrent users from a plurality of different types of browsers on the same computer.

31. The computer accessible medium as recited in claim 26, wherein the first user environment is at least partially defined by a network domain controller, and wherein the second user environment is at least partially defined by a different network domain controller.

\* \* \* \* \*